June 9, 1964  W. J. WILLIAMS  3,136,227
BRAKE OPERATING MECHANISM
Filed Aug. 29, 1960  2 Sheets-Sheet 1
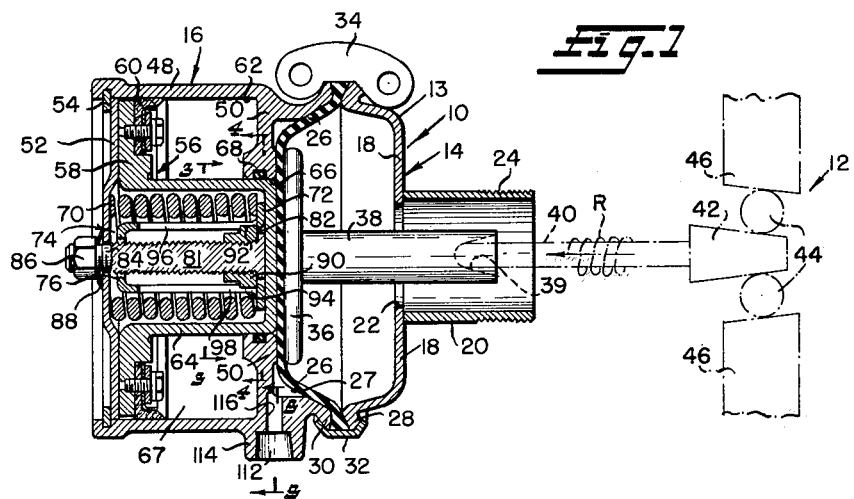
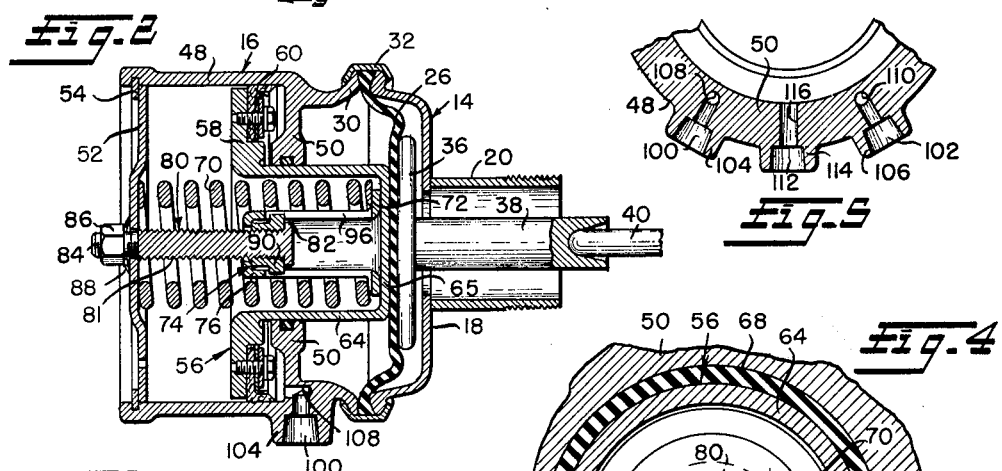
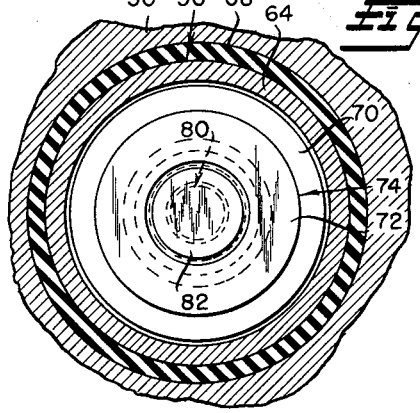
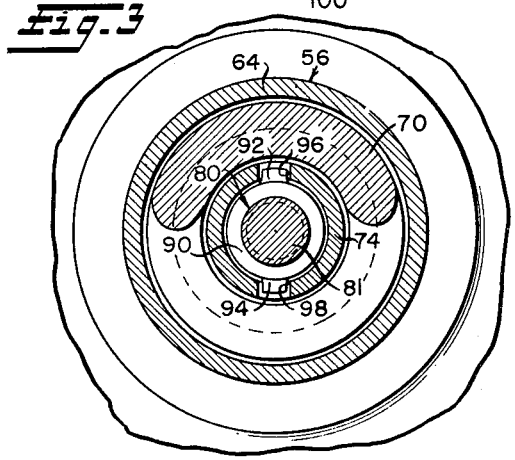
INVENTOR.
William J. Williams
BY
Strauch, Nolan + Neale
ATTORNEYS INVENTOR
William J. Williams

United States Patent Office 3,136,227
Patented June 9, 1964

3,136,227
BRAKE OPERATING MECHANISM
William J. Williams, Ashtabula, Ohio, assignor to Rockwell-Standard Corporation, Coraopolis, Pa., a corporation of Pennsylvania
Filed Aug. 29, 1960, Ser. No. 52,711
15 Claims. (Cl. 92—63)

The present invention refers to automotive vehicle brake operating mechanism especially for trucks, buses, and other heavy roadway vehicles and more particularly to a combination service and emergency air brake actuator which is effective to arrest vehicle movement in the event of loss of brake operating air pressure.

Brake safety devices for the purpose have been proposed which are spring energized under emergency conditions, such as low air pressure, to apply the brakes, but certain difficulties involving installation requirements, structural limits, size, maintenance, assembly and disassembly, weight, cost and operating efficiency have been encountered.

Moreover, in such emergency brake operating mechanisms, in which the stored energy of a compression spring is used to apply the brakes when the air pressure fails, it is necessary to provide an additional actuator chamber for the mechanical spring of such size and volume as to allow sufficient expansion of the spring to move brake operating push rod through the proper distance required to apply the brakes. Although in most instances this additional actuator chamber is directly attached to the service air chamber, either behind or in front of it making a unitary assembly, it has been often found that this dual chamber unit was of extreme size and consequently interfered with other structural components of the vehicle and prevented their application in actual practice.

In other instances it was extremely difficult to assemble, disassemble or service such spring loaded units because of the relatively heavy coil spring required for effective brake application. In known units of this type the spring is usually held compressed by a diaphragm or piston under air or other fluid pressure and abuts at the other end against the rear wall of a cylinder. In many conventional units in order to remove or replace the spring or for maintenance purposes the entire unit had to be disassembled and extreme care had to be taken to prevent explosion of the compressed spring with resulting injuries to the mechanic and damage to the unit.

A further disadvantage in many conventional units was that when the brakes had been applied by the emergency device they could not be released again until the damage or leakage in the air or fluid supply system had been remedied and proper air or fluid pressure restored. In many instances it would be necessary to move the vehicle to another location after an emergency stop and, therefore, either the brake rod or entire emergency unit had to be disassembled in order to release the brakes and enable the vehicle to be moved.

To overcome the foregoing and other disadvantages of prior devices the present invention provides a compact service and emergency brake actuator unit adaptable to any normal installation requirements and easily to maintain and to assemble and disassemble.

Accordingly, it is the main object of the present invention to provide a novel service and emergency brake actuator unit for motor vehicles which becomes effective to arrest motion of the vehicle when the brake operating air pressure falls below its predetermined limit.

Another object of the present invention is to provide in a novel emergency brake actuator a piston having an integral hollow push rod containing a compressed coil spring adapted to expand when air pressure in the emergency chamber falls below a predetermined limit.

A further object of the present invention is the provision of screw and nut means contained within the coil spring and push rod for adjustment and brake release after an emergency application and to prevent explosion of the spring during assembly and disassembly of the unit.

Still another object of the present invention is the provision of a self-contained piston, push rod, spring and back-up plate assembly for a novel emergency brake actuator which can be easily removed and installed for maintenance purpose.

Other objects and novel features will become evident as the following detailed description proceeds with reference to the appended drawings in which:

FIGURE 1 is a longitudinal section through a service and emergency brake actuator unit according to a preferred embodiment of the invention in released position and showing a diagrammatic connection to a brake actuator;

FIGURE 2 shows in section the unit of FIGURE 1 in emergency applied position rotated about 30° on its axis.

FIGURE 3 is an enlarged vertical cross section through the emergency push rod and spring assembly substantially along line 3—3 of FIGURE 1;

FIGURE 4 is another likewise enlarged vertical cross section through the intermediate wall portion between both chambers substantially along line 4—4 of FIGURE 1;

FIGURE 5 is a fragmentary cross section through the air inlet portion of the unit substantially as seen along line 5—5 of FIGURE 1.

FIGURE 1 shows a dual air brake actuator unit for motor vehicle brakes generally indicated at 10 which in the illustrated example is adapted to actuate a wedge and roller type brake actuator 12 shown in broken lines. It will, of course, be understood that any other known brake actuating mechanism may be associated with the invention.

Figure 6:
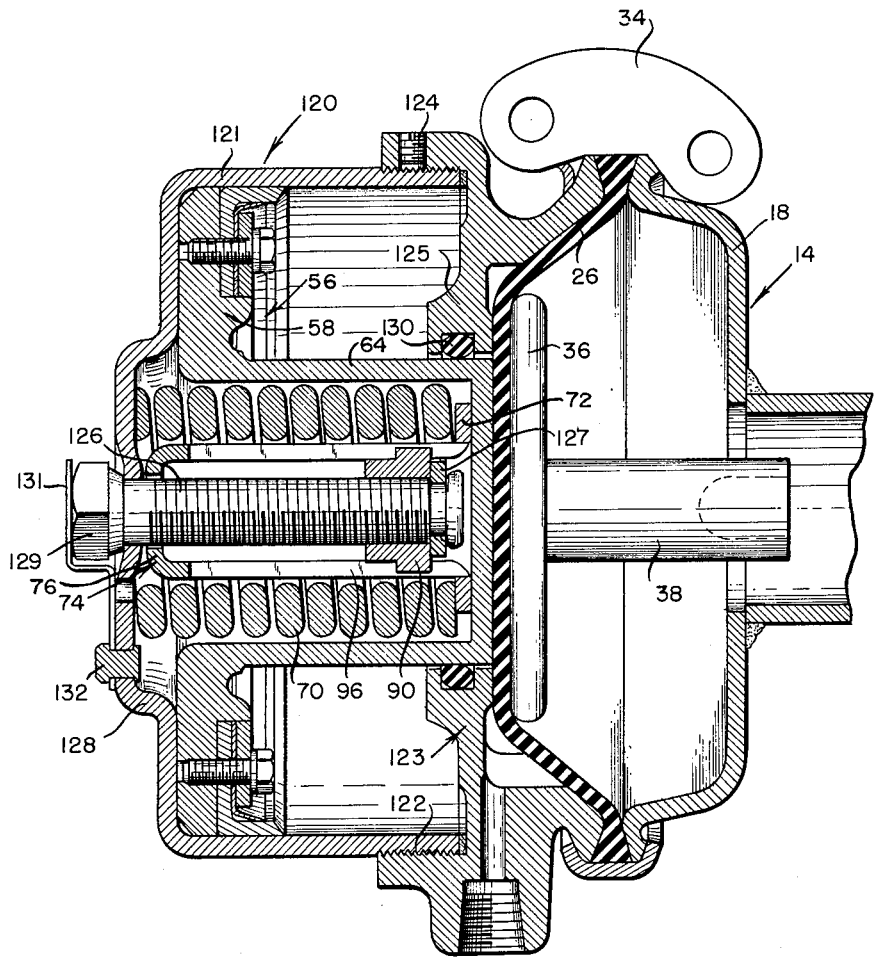
FIGURE 6 is a section showing a further embodiment.

The dual air brake actuator unit 10 is composed of an air actuated service chamber section 14 and a spring actuated emergency chamber section 16 behind and essentially unitary with section 14. Service chamber section 14 comprises a stamped sheet metal cup 18 welded or otherwise attached to a tubular adapter 20 positioned around a central aperture 22 in cup 18. Adapter 20 is provided with external threads 24 to enable the unit 10 to be screwed directly onto the respective brake support plate or spider (not shown) on the vehicle axle. In place of the adapter 20 screws (not shown) may be provided in the cup 18 to attach the unit 10 to a conventional brake chamber bracket (not shown).

Service chamber 14 contains a flexible diaphragm 26 clamped around its outer edge between the outwardly turned flange 28 of cup 18 and a similar outwardly turned flange 30 on the wall of emergency chamber section 16. Flanges 28 and 30 are drawn together in assembled relation by a clamping ring 32 surrounding the flanges 28 and 30 and secured by a clamp 34 to provide an assembled unit. The major portion of diaphragm 26 abuts a circular pad 36 integral or otherwise secured to a push rod 38 which extends through aperture 22 in cup 18 and pivotally connects at 39 to a push rod 40 having a wedge member 42 at the other end disposed between rollers 44 adapted to roll along the inclined surfaces of brake shoe plungers 46 upon reciprocation of the wedge 42. For example, this brake mechanism may be that of the copending application of Cox et al. Serial No. 758,501 filed September 2, 1958. The usual brake return springs alone or acting with an auxiliary spring urge rod 40 to the left brake release position of FIGURE 1.

Emergency cylinder section 16 comprises a cylindrical housing 48 having forwardly a transverse end wall 50 at the bottom of the cup-shaped end formation provided by outwardly turned flange 30. Wall 50 constitutes a common wall for both chambers at 14 and 16 and diaphragm 26 of the service chamber 14 abuts against it in the brake released position illustrated in FIGURE 1. Wall 50, flange 30 and cup 18 thus define the diaphragm housing which is divided internally by diaphragm 26 into a fluid pressure chamber 27 and a push rod chamber 29. The rear end of housing 48 is closed by an internal press fitted removable closure plate 52 secured by a snap ring 54 seated in an internal housing groove.

Housing 48 slidably receives a reciprocable piston 56 of unique construction. Piston 56 comprises an enlarged end flange section 58 which in the brake released position of FIGURE 1 abuts against closure plate 52. Attached to flange 58 is a flexible leather cup 60 which is in sliding pressure sealing engagement with the inner wall 62 of housing 48. Flange 58 is centrally formed with a hollow cylindrical boss 64 which extends slidably through an aperture 66 in the center of wall 50 and is adapted to abut with its closed end 65 against the rear of the flexible diaphragm 26. Boss 64 of piston 56 thus constitutes in effect a push rod for the emergency brake actuator. Wall 50 is provided within aperture 66 with a groove containing an O-ring or other compressed seal of rubber or other plastic material 68 (FIGURE 4) to seal chamber 27 against piston chamber 67 surrounding boss 64.

Coaxially mounted in piston boss 64 is a relatively strong coil compression spring 70 which abuts at the rear against axially stationary closure plate 52 and at its other end engages a flange 72 on a small diameter cylindrical tube 74, which flange 72 seats against the inner side of the closed end 65 of boss 64. Tube 74 is freely slidably disposed within the coils of spring 70 for a purpose to appear but held relatively non-rotatable by spring 70.

Tube 74 has a closed rear wall 76 having a central aperture 78 through which a screw rod 80 extends freely. Screw rod 80 is provided at its end within tube 74 with a flange 82 which normally abuts against the inside of the closed end 65 of piston boss 64 as seen in FIGURE 1. At the other end screw rod 80 is provided with a reduced diameter threaded end 84 which extends through closure plate 52 and is outwardly secured thereto by a nut 86 and resilient washer 88. The reduced diameter end 84 is provided to prevent the screw rod 80 from sliding rearwardly through the aperture in the closure plate 52 so that the larger diameter shank 81 of the screw rod is securely retained within the chamber 16, and the resilient washer 88 is provided to enable the screw rod 80 to be turned. Threaded rotatably on the shank 81 of the screw rod 80 is an axially movable nut 90 having two ears 92 and 94 on opposite sides thereof which are adapted to slide in provided longitudinal slots 96 and 98 of the tubular spring retainer 74 as illustrated best in FIGURE 3 to prevent the nut 90 from rotation. Nut 90 is seated against rod flange 82, and it slidably non-rotatably connects rod 80 to tube 74.

In normal vehicle operation air at service pressure is introduced from a source into chamber 27 at 112, 116 under control of a suitable pedal actuated valve (not shown) when the brakes are to be applied. This drives diaphragm 26 to the right, and advances rods 38 and 40 to cause wedge 42 to spread the brake shoes into drum engagement. When the air pressure is relieved from chamber 27, the return springs of the brake restore the diaphragm 26 and associated parts to FIGURE 1 position.

During this normal operation, there is no action by piston 56 except to serve as a rear stop for part of diaphragm 26. This is because the air from the source at source pressure is constantly supplied into annular piston chamber 67 to maintain the piston 56 in the FIGURE 1 position, spring 70 being compressed and energized at this time.

Air under pressure corresponding to the predetermined pressure for the system is introduced into the piston chamber 67 by way of two spaced apart inlets 100 and 102 (FIGURES 2 and 5) located in bosses 104 and 106 protruding from the housing 48 adjacent flange 30 and substantially in line with the internal wall 50 and similar connecting conduits 108 and 110 (FIGURE 2) are bored therethrough. The service chamber inlet 112 (FIGURES 1 and 5) is positioned intermediate the emergency inlets 100 and 102 aligned therewith in the same vertical plane located in a similar boss 114. The inlet conduit 116 extends partly through the wall 50 to allow pressurized air to be introduced into service chamber 27 for application of the brakes as above described.

In case the source air pressure falls gradually below a predetermined limit, the emergency actuator 16 will now be automatically activated and the coil spring 70 will expand at a rate corresponding to the amount of air pressure reduction in the system for gradually applying the brakes. This is due to the gradual lowering of air pressure in chamber 67 until piston 56 can no longer be held against abutment 52. The expansion of coil spring 70 causes the piston 56 to move to the right in FIGURE 1 whereby piston push rod 64 regardless of the pressure in chamber 27 imparts brake applying motion to the service chamber diaphragm 26 and push rod 38. This motion is stopped when retainer wall 76 reaches nut 90. In some instances it may be desirable to employ a bleeder valve (not shown) at the emergency chamber 16 to completely bleed-off the emergency chamber when the air pressure in the system fails so that the brakes will be applied at once to prevent continuous dragging of the brakes in case the air pressure falls very slowly because of a small leak. Of course should the air pressure at the source fail completely the piston 56 will act more quickly.

Screw rod 80, nut 90 and tubular spring retainer 74 cooperate with each other to effect (1) stroke adjustment of the emergency piston, (2) entire lock-out of the emergency actuator, (3) brake release after emergency application and (4) in cooperation with the closure plate 52 prevention of explosion of the coil spring during assembly and during disassembly of the unit.

When the emergency actuator is applied the stroke of the piston 56 is limited by the ability of the coil spring 70 to expand a distance equal to the distance between the closed end 76 of the tubular spring retainer 74 and the nut 90 on screw rod 80 as illustrated in FIGURE 1, until the closed end 76 of the spring retainer 74 abuts against the nut 90 as in FIGURE 2 which stops further brake applying movement of piston 56. It will be seen that, upon rotation of the screw rod 80, nut 90 will be forced by means of the guiding ears 92 and 94 which slide in slots 96 and 98 of the relatively non-rotatable retainer 74 to travel axially along the screw rod to vary the effective stroke distance of piston 56. The resilient washer 88 enables the screw rod 80 to be rotated without being locked by the external nut 86.

If it is for some reason desired to completely lock out the emergency actuator, the screw rod 80 is rotated until nut 90 is moved to the left in FIGURE 1 until nut 90 abuts end wall 76 of retainer 74 to hold spring retainer 74 in its rearmost position illustrated in FIGURE 1 which holds coil spring 70 from any expansion. The same procedure is followed during disassembly of the unit for maintenance purposes. After the coil spring 70 has been so confined against expansion, snap ring 54 is removed which then allows the removal of the complete screw rod, spring retainer, coil spring and closure plate assembly held together by the nut 86, whereafter the piston 56 may be easily slidably removed for leather cup or O-ring seal replacement. Reassembly of the unit may be just as easily and quickly accomplished.

After the brakes have been applied by the emergency actuator piston 56 and the parts have reached the position illustrated in FIGURE 2, it will be necessary to release the brakes manually in order to move the vehicle to a repair place. This can be done quickly and easily in the present invention by rotating screw rod 80 to move stop 90 to the left in FIGURE 2. This pulls the spring retainer 74 to the left and compresses coil spring 70, whereupon cylinder 56 is forced to the left by means of service diaphragm 26 and push rod 38 transmitting the force of the usual brake return springs (not shown). FIGURE 1 shows at R diagrammatically the usual return spring and its direction of action effective on rod 38. Upon restoration of proper air pressure in the system, screw rod 80 may again be rotated to reversely advance nut 90 to again establish the proper operative stroke distance for piston 56.

Due to the novel concept of insertion of the coil spring into the emergency piston push rod the unit can be held to shorter, more desirable dimensions than hereinbefore feasible.

The unique adjustment means which includes a lockout and anti-explosion arrangement provides that the unit can be quickly and safely disassembled for maintenance, reducing downtime of the vehicle and possible damage to the unit or injuries of the mechanic by preventing the relatively strong coil spring from exploding during disassembly.

After an emergency brake application, the brakes can be quickly and easily manually released in order to move the vehicle using ordinary tools and without great skill, which is important in case the vehicle should come to a stop on a danger point, as for instance on railroad tracks, or unduly obstructing traffic.

Thus it has been provided an effective, compact and easy to install and maintain service and emergency brake actuator unit which conforms to any standard installation requirement.

FIGURE 6 illustrates a further embodiment wherein the housing structure is different. Here the emergency chamber section 120 comprises an integral cup 121 having an open end threadedly connected at 122 to an intermediate annular separating member 123. A set screw 124 locks the cup 121 to member 123. The right hand end of member 123 is shaped as at 30 in FIGURE 1 to be attached to cup 18 as by clamp 34 in the same manner.

Interiorly member 123 is formed to provide a wall 125 similar to wall 50 of FIGURE 1 provided with a seal 130 like seal 68 of FIGURE 1.

Piston 58, spring 70 and tube 74 are essentially as in FIGURE 1 and designated by the same numerals in FIGURE 6.

In the FIGURE 6 embodiment nut 90 is mounted on a one-piece threaded bolt 126 on the inner end of which is rigidly secured a ring 127 to restrict axial movement of nut 90 to the right. At its outer end bolt 126 extends with a rotating fit through otherwise closed rear wall 128 of cup 121 to terminate in an enlarged non-circular head 129, and a spring retainer 131 maintains bolt 126 against axial movement. Retainer 131 is preferably a leaf spring anchored at 132 and bearing on the end of bolt 126.

The foregoing structure of FIGURE 6 operates essentially the same as the other embodiment, but its three part enclosure consisting of sheet metal stampings 18 and 121 and die casting 123 provide a structure that is relatively easy and inexpensive to make and assemble.

The present invention may be embodied in other specific forms without departing from the essential characteristics or spirit thereof, therefore, the present embodiment is to be considered in all respects as illustrative only and not restrictive, the scope of the invention being indicated by the appended claims rather than by the foregoing description.

What is claimed and desired to be secured by United States Letters Patent is:

1. In a brake actuator, a casing assembly defining a service chamber and an emergency chamber having a wall between them, a first fluid pressure responsive member in said service chamber enclosing an inner fluid pressure control space adjacent said wall and having an outer connection for brake mechanism, a second fluid pressure responsive member in said emergency chamber enclosing a fluid pressure control space adjacent said wall and having a portion extensible through said wall for operative abutment with said first member, spring means for urging said second member toward said wall, means mounting a removable rear wall on said emergency chamber, and means distinct from said second member for compressing said spring means and securing said compressed spring means to said rear wall whereby removal of said rear wall from said chamber carries along with said rear wall the compressed spring means.

2. In a brake actuator, a casing assembly defining a service chamber and an emergency chamber having a wall between them, a fluid pressure responsive member in said service chamber enclosing an inner fluid pressure control space adjacent said wall and having an outer connection for brake mechanism, a reciprocable piston in said emergency chamber having a hollow push rod portion extensible through said wall into abutment with said member, spring means extending within said push rod urging said piston toward said wall, and means defining a fluid pressure control space between said piston and said wall.

3. In a brake actuator, a casing assembly defining a service chamber and an emergency chamber having a wall between them, a fluid pressure responsive member in said service chamber enclosing an inner fluid pressure control space adjacent said wall and having an outer connection for brake mechanism, a reciprocable piston in said emergency chamber having a hollow inner portion slidably mounted in an aperture in said wall, spring means extending within said hollow portion urging said piston toward said wall, means defining a fluid pressure control space between said piston and said wall, said emergency chamber having a relatively stationary rear wall against which said spring means reacts, a post axially fixed on said rear wall extending through said spring means, and a stop on said post adjustable longitudinally thereof for limiting movement of said piston by said spring means toward said wall between the chambers.

4. In a brake actuator, a casing assembly defining a service chamber and an emergency chamber having a wall between them, a fluid pressure responsive member in said service chamber enclosing an inner fluid pressure control space adjacent said wall and having an outer connection for brake mechanism, a reciprocable piston in said emergency chamber having a portion slidable in said wall in abutment with said member, spring means urging said piston toward said wall, means defining a fluid pressure control space between said piston and said wall, a relatively stationary rear wall for said emergency chamber, an axially fixed post rotatably mounted on said rear wall, a stop rotatably mounted on said post, a spring retainer disposed within said spring means and held in axially fixed relation to said piston, a slidable non-rotatable connection between said stop and said retainer, and means externally of said rear wall for rotating said rod, rotation of said rod causing axial displacement of said stop within said retainer.

5. In a brake actuator, a casing assembly defining a service chamber and an emergency chamber having a wall between them, a fluid pressure responsive member in said service chamber enclosing an inner fluid pressure control space adjacent said wall and having an outer connection for brake mechanism, a reciprocable piston in said emergency chamber having a portion extending through said wall for operative connection with said member, spring means for urging said piston toward said wall, means defining a fluid pressure control space between said piston and said wall, a removable end portion on said emergency chamber, a rod on said end portion projecting into said emergency chamber, means distinct from said piston supporting said spring means upon said rod, said spring means being separably engaged with said piston, and cooperative means on said rod and end portion for selectively separating said spring means from said piston and confining said spring means in compressed condition upon said rod, whereby removal of said end portion removes the compressed spring means from the emergency chamber.

6. In a brake actuator, a casing assembly defining a service chamber and an emergency chamber having a wall between them, a removable rear wall for said emergency chamber, a fluid pressure responsive member in said service chamber enclosing an inner fluid pressure control space adjacent said wall between the chambers and having an outer connection for brake mechanism, a reciprocable piston in said emergency chamber having an operative connection through said wall between the chambers with said member, spring means urging said piston toward said wall between the chambers, means defining a fluid pressure control space between said piston and said wall between the chambers, a hollow central inner portion on said piston open toward said rear wall, said spring means comprising a coil compression spring coaxial with said piston extending from said rear wall into said hollow piston portion and separably contacting said piston, means adjustable from externally of said rear wall for compressing the spring and holding it on said rear wall, said rear wall and compressed spring being thereby removable as a unit from the casing.

7. In a brake actuator, a casing assembly defining a service chamber and an emergency chamber having a wall between them, a fluid pressure responsive member in said service chamber enclosing an inner fluid pressure control space adjacent said wall and having an outer connection for brake mechanism, a reciprocable piston in said emergency chamber having a hollow push rod portion slidable in and forming a part of said wall in end abutment with said fluid pressure responsive member, spring means extending into said push rod portion for urging said piston toward said wall, and means defining a fluid pressure control space between said piston and said wall for containing fluid under pressure to urge said piston away from said wall and compress said spring means within said push rod portion.

8. In a brake actuator, a casing comprising an intermediate member having a central opening, means at one side of said member defining a service chamber comprising a casing end portion secured to said member and mounting a first pressure responsive element having a brake mechanism actuating connection extending through said end portion, a cup-shaped casing portion secured to the other side of said member and defining therewith an emergency chamber, a piston slidable within said cup-shaped member and projecting into said opening for operative abutment with said element, an axially rigid support on the base of said cup-shaped member projecting axially of said piston, compression spring means on said support extending between said base and said piston, said spring means being separably engaged with said piston, and cooperating means on said support and said base for axially compressing said spring means and securing said compressed spring means upon said support, whereby removal of the cup shaped casing portion may carry therewithin the compressed spring means.

9. In an actuator for emergency operation in a brake system connected to a source of fluid pressure, casing means defining internal service and emergency chambers, a fluid pressure responsive member in said service chamber adapted for operative connection to a brake mechanism, and a piston in said emergency chamber adapted for operative connection to said member when the source pressure falls below a predetermined value, said casing having an end wall and a rod on said end wall extending into the emergency chamber, stop means on the inner end of said rod, a tubular spring retainer having its inner end abutting said piston and its outer end telescoped over said rod and formed for operative engagement with said stop means, and a coiled compression spring extending between the inner end of said retainer and said end wall of said casing.

10. In the actuator defined in claim 9, said rod being rotatable about its axis and having a threaded inner end, and said stop means comprising a nut threaded rotatably on said rod having a non-rotatable slide connection with said retainer, and a manually operable head on said rod outside the casing.

11. In a brake system having a source of fluid pressure and mechanism for actuating a brake shoe, means defining a housing having an internal wall separating it into two chambers, and one end of said housing comprising a detachably mounted cup-shaped member enclosing one of said chambers, said cup-shaped member having a cylindrical wall defining a cylinder and an external wall defining an end wall of said housing, a first fluid pressure responsive member in said other chamber, means for selectively applying fluid under pressure from said source to said other chamber to move said first fluid pressure responsive member in the direction to actuate the brake shoe, a second fluid pressure responsive member in said one chamber comprising a piston slidable in said cylinder, a spring assembly on one side of said piston, means for constantly applying fluid pressure from said source into said one chamber to urge said second fluid pressure responsive member in the direction to compress said spring assembly between said piston and said housing end wall, said fluid pressure responsive members being independently movably mounted within said housing, means extending from said piston through said internal housing wall operably connecting said members together for movement in the direction to actuate said brake mechanism under the expansion force of said spring assembly only when said source pressure falls below a predetermined value, means on said housing end wall mounting said spring assembly to project into said one chamber into operative abutment with said piston and having a stop in operative engagement with the inner end of said spring assembly for limiting expansion of said spring assembly toward said piston, whereby said spring assembly in compressed condition and said stop may be removed as unit when said cup-shaped housing member is detached.

12. In a brake actuator, a casing assembly defining a service chamber and an emergency chamber having a wall between them, a first fluid pressure responsive member in said service chamber enclosing an inner fluid pressure control space adjacent said wall and having an outer connection for brake mechanism, a second fluid pressure responsive member in said emergency chamber enclosing a fluid pressure control space adjacent said wall and having a portion extensible through said wall for operative abutment with said first member, spring means for urging said second member toward said wall, a removable rear wall on said emergency chamber, and means for compressing said spring means and securing said compressed spring means to said rear wall for removal from the emergency chamber upon removal of said rear wall, said portion of said second member being slidably mounted in an aperture in said wall between the chambers and being hollow for enclosing at least one end of said spring means.

13. In a brake actuator comprising a housing having an internal wall separating it into service and emergency chambers, a fluid pressure responsive member in the service chamber adapted for connection to brake mechanism, a piston slidable in the emergency chamber between one stroke limit position where it abuts an end wall of said housing and the other stroke limit position where it abuts the internal wall of the housing, a hollow push rod on said piston projecting through an aperture in said internal wall to abut said fluid pressure responsive member, a compression spring reacting between said piston and the housing end wall enclosed within said push rod when said piston is in said one position, and means defining fluid pressure control spaces in the respective chambers on opposite sides of said internal wall.

14. In a combined safety and service brake unit having an intermediate wall separating a service chamber and an emergency chamber, a piston in said emergency chamber having a stem projecting through an aperture in said wall, spring means within said emergency chamber for biasing said piston toward said service chamber, means for introducing fluid under pressure into said emergency chamber for displacing said piston away from the service chamber to compress and hold retracted said spring means, a spring retainer assembly comprising telescoped members projecting through said spring means and axially extensible when said spring means expands to displace the piston toward said service chamber, cooperating stop means on said members for limiting extension of said retainer assembly when said spring means is expanded, and manual means for relatively displacing said telescoped members through coaction of said stop means to compress said spring means from expanded condition.

15. In the combined safety and service brake unit defined in claim 14, one of said telescoped members being axially fixed relative to said piston and the other telescoped member being rotatably mounted on said housing, and said stop means comprising a first abutment on said other member that is axially displaced toward an associated abutment on said one member when said other member is manually rotated.

References Cited in the file of this patent
UNITED STATES PATENTS

| | | |
|---|---|---|
| 2,754,805 | Beman | July 17, 1956 |
| 2,809,723 | Howze | Oct. 15, 1957 |
| 2,992,630 | Leighton et al. | July 18, 1961 |